G. R. MURRAY.
STONE GRINDING AND POLISHING MACHINE.
APPLICATION FILED AUG. 5, 1912.

1,138,683.

Patented May 11, 1915.
4 SHEETS—SHEET 1.

ATTEST

INVENTOR
George R. Murray
By Fisher & Ullost ATTYS.

G. R. MURRAY.
STONE GRINDING AND POLISHING MACHINE.
APPLICATION FILED AUG. 5, 1912.

1,138,683.

Patented May 11, 1915.
4 SHEETS—SHEET 2.

ATTEST

INVENTOR
George R. Murray
BY Fisher & Mast ATTYS.

G. R. MURRAY.
STONE GRINDING AND POLISHING MACHINE.
APPLICATION FILED AUG. 5, 1912.

1,138,683.

Patented May 11, 1915.
4 SHEETS—SHEET 3.

ATTEST
E. M. Fisher
F. C. Musson

INVENTOR
George R. Murray
BY Fisher & Mosler ATTYS.

G. R. MURRAY.
STONE GRINDING AND POLISHING MACHINE.
APPLICATION FILED AUG. 5, 1912.

1,138,683.

Patented May 11, 1915.
4 SHEETS—SHEET 4.

ATTEST
EM Fisher
F. C. Musson.

INVENTOR
George R. Murray
By Fisher + Mosert
ATTYS.

UNITED STATES PATENT OFFICE.

GEORGE R. MURRAY, OF CLEVELAND, OHIO.

STONE GRINDING AND POLISHING MACHINE.

1,138,683.   Specification of Letters Patent.   Patented May 11, 1915.

Application filed August 5, 1912. Serial No. 713,218.

*To all whom it may concern:*

Be it known that I, GEORGE R. MURRAY, citizen of the United States, residing at Cleveland, in the county of Cuyahoga and State of Ohio, have invented certain new and useful Improvements in Stone Grinding and Polishing Machines, of which the following is a specification.

My invention relates to improvements in stone-grinding and polishing machines, and the improvement comprises a construction and arrangement of parts substantially as herein shown and described and more particularly pointed out in the claims.

The object of the invention is to provide a machine in which a series of slabs of stone, marble or the like may be consecutively ground and also polished with a minimum of labor and time and at a great saving in cost.

The object also is to provide a machine which will insure perfectly plane surfaces in the product and a uniformly good output.

Figure 1:
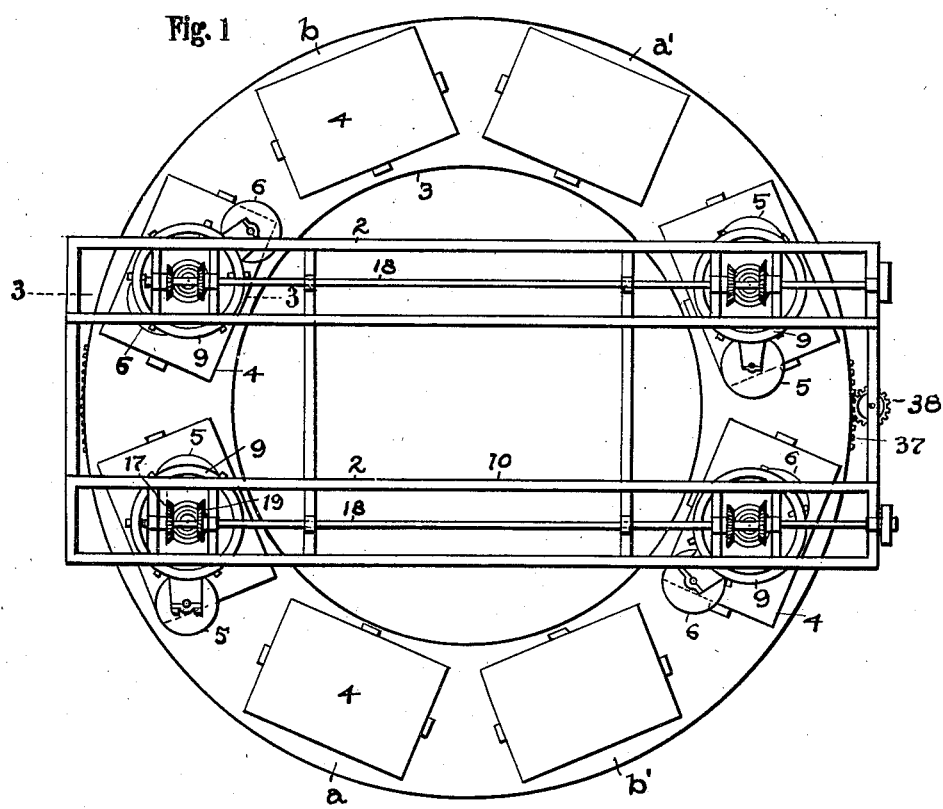
Figure 2:
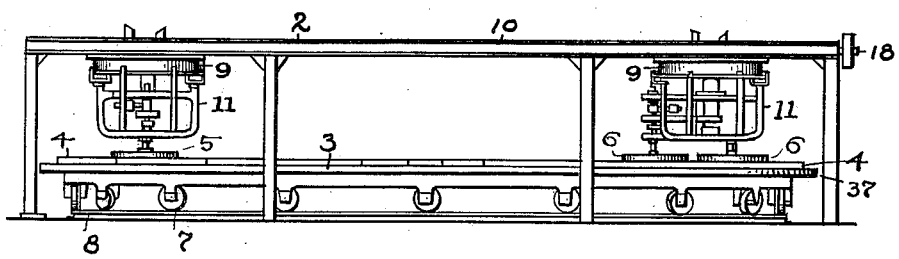
Figure 3:
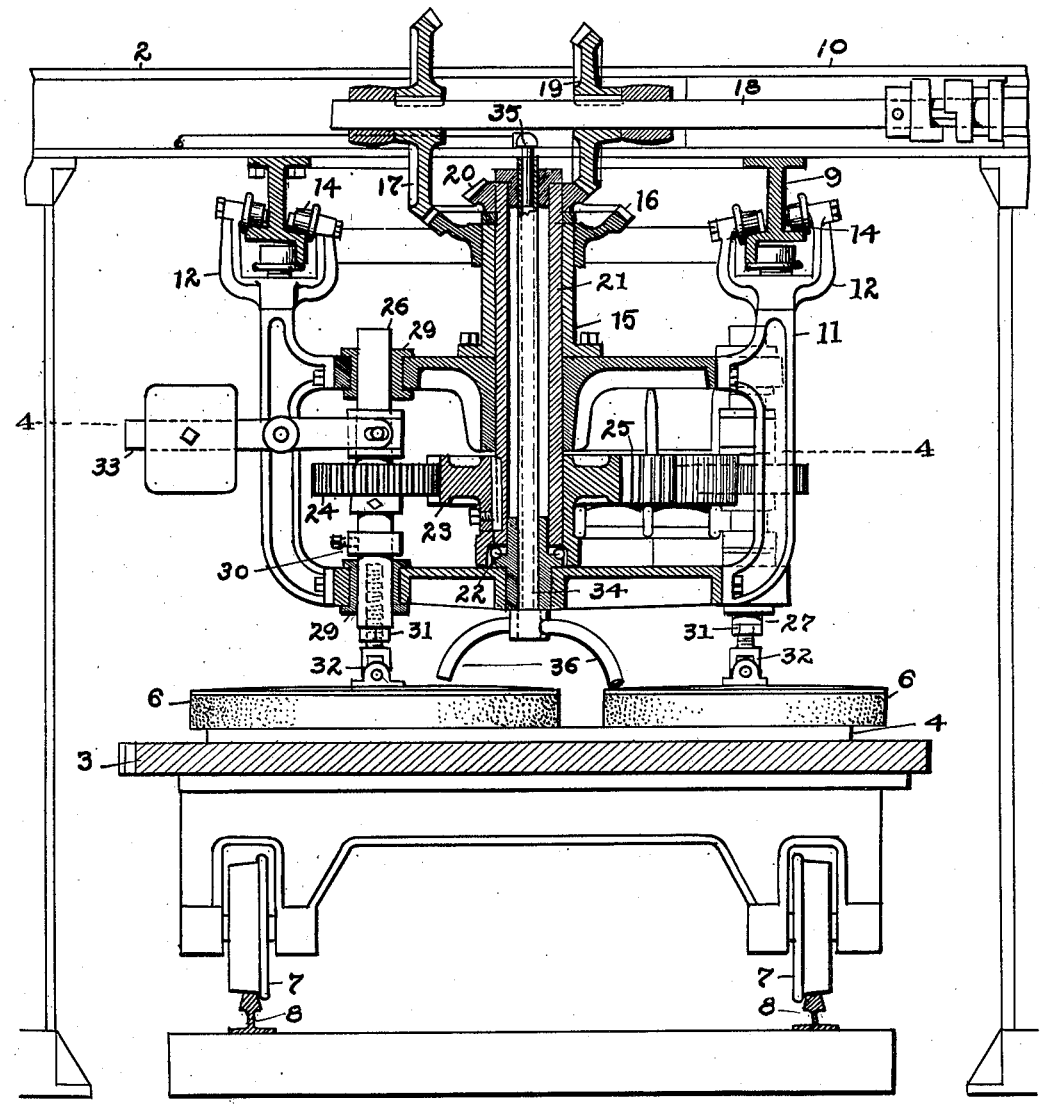
Figure 4:
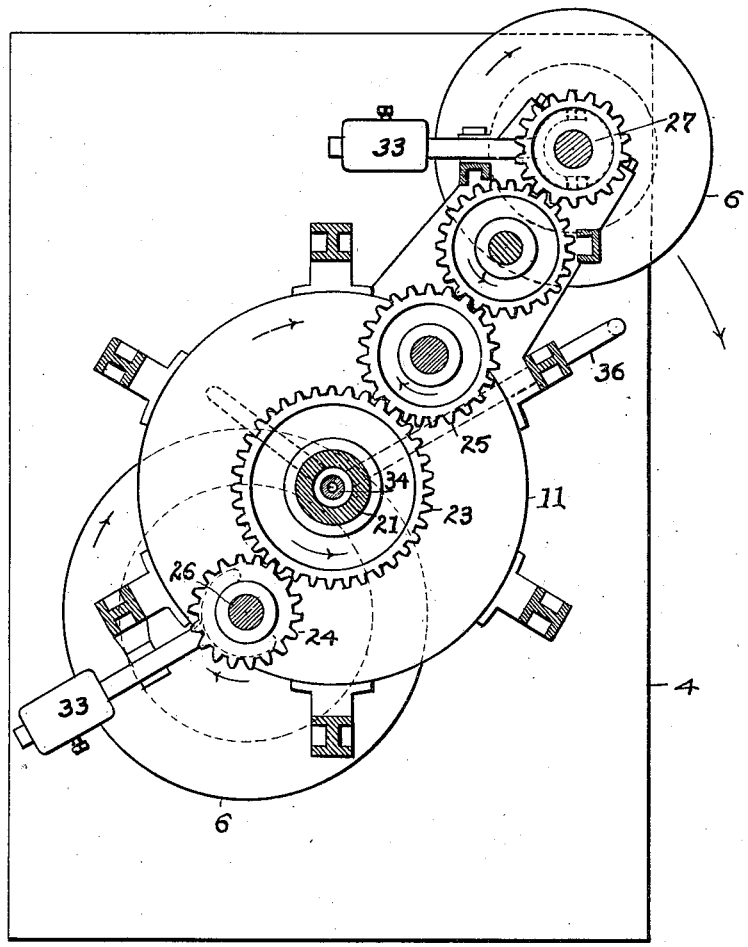
Figure 7:
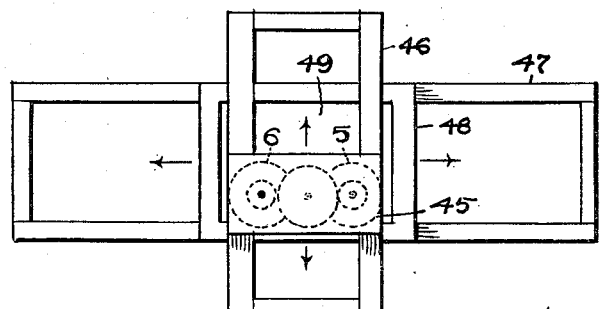
Figure 5:
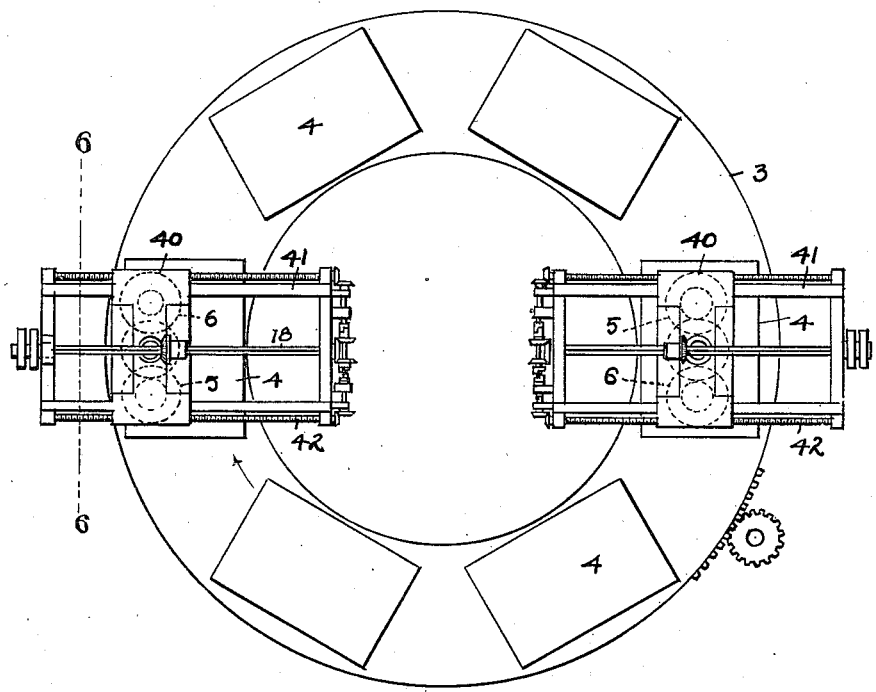
Figure 6:
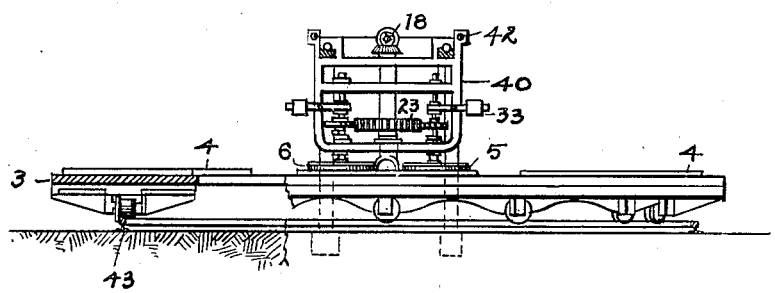

In the accompanying drawings, Figure 1 is a plan view on a reduced scale of my improved machine, and Fig. 2 is a side elevation thereof. Fig. 3 is a sectional view, enlarged as compared with the foregoing figures of the machine on a line corresponding to 3—3, Fig. 1. Fig. 4 is a horizontal section on line 4—4, Fig. 3. Fig. 5 is a plan view of a modification of the machine shown in Fig. 1, and Fig. 6 is a vertical cross section on line 6—6, Fig. 5. Fig. 7 is a plan view of a further modification of the invention.

The machine illustrated in Figs. 1 to 4 inclusive, comprises an overhead frame 2 spanning or bridging a rotatable table 3 of ring-shape upon which a plural number of slabs 4 may be placed at equally-distant radial points. By means of this table, or its equivalent, each slab may be carried and brought to rest at intermittent intervals beneath separate sets of grinding and polishing members 5 and 6 respectively. These members are shown arranged in pairs, but may be grouped in greater numbers, and the pair represented by 5 are for initial grinding, and the members 6 are for final polishing purposes. Members 5 are arranged in advance of the members 6 on the arc of travel of the slabs 4 so that the rough grinding must precede polishing, and this is true of both sets of members on the diametrically opposite sides of table 3. If grinding and polishing of only one surface of the slab is to be performed, the slabs may be placed upon the table at *a* or *a'* at one side of frame 2 and then removed at *b* or *b'* at the other side of said frame after passing beneath both pairs of the members 5 and 6. Under these conditions, the operation and output may be doubled. However, if grinding and polishing of both surfaces of each slab is to be performed, then each slab placed on table 3 at *a* will first pass beneath the members 5 and 6 at the left and be inverted before passing beneath the members 5 and 6 at the right. Each finished slab is then removed at *b'* on the same side of frame 2 where it was originally placed, after making substantially a complete circuit. Table 3 is supported by wheels 7 traveling on circular tracks 8, or these means may be substituted by any equivalent slab-carrying means adapted to travel in a circle in an absolutely true horizontal plane. In other words the inventive concept broadly includes any supporting means for carrying the slabs successively in a circle beneath a series of grinding and polishing members.

The invention also broadly includes a movable carrier for the grinding and polishing members, whereby said members may be moved over the entire surface of each slab as it rests or passes beneath the same.

One form of a movable carrier for the grinding and polishing members, is shown in Figs. 3 and 4, and as all these carriers are alike a description of one will suffice for all. Thus, frame 2 has a circular or endless track 9 of I shape secured to the underside of the overhead cross beams 10, and a crib or carrier 11 is rotatably suspended therefrom, the axis of rotation being at the exact vertical center of the circular track. The carrier 11 is provided with three or more yoke arms 12 having rollers 14 engaging and riding upon the flanges of the I beam, and this or any equivalent means may be used to keep the carrier traveling in a true circle in the same horizontal plane. A central hub 15 fixed to carrier 11 has a bevel gear 16 meshing with a similar gear 17 on power shaft 18 mounted in suitable bearings upon frame 2, and a second set of gears 19 and 20 also driven by said power shaft serve to rotate the hollow spindle 21 within hub 15 but in the opposite direction to that of the carrier 11. Spindle 21 may be supported at its lower end by ball bearings 22, and is provided with a gear 23 meshing with other gears 24 and 25 which serve to rotate independent drive shafts 26 and 27, respectively, for the grinding members 5 or 6. Shafts 26 and 27 are rotatably and slidably mounted in vertical position in bearings 29 affixed to carrier 11, and the downward movement of the said shafts is limited by a stop collar 30 adjustably fixed upon each shaft, thereby determining the depth of grinding cut in the slab and providing means for taking up wear in the grinding members, and also adjustment for slabs of any thickness. The grinding members are also adjustably secured to the lower ends of the shafts by a screw and nut connection 31 or other means, and a knuckle or universal joint 32 is also preferred at this point of union with the grinding members. A weighted lever 33 fulcrumed on carrier 11 is also connected with the shafts 26 and 27 to counterbalance the grinding members in part or to overcome any excess weight, and the said grinding members may be bodily raised by these means or by other suitable devices when the slabs are carried beneath the same.

A central pipe 34 having a water supply connection 35 at its top, and one or more discharge extensions 36 at its bottom, is supported within and by the carrier 11 and spindle 21, and this pipe preferably rotates with the carrier and discharges water on the slab at either side of the grinding or polishing members. In Fig. 4, one of the members 6 of the set is shown as of less diameter than the other and also offset a greater distance from the axial center of rotation of carrier 11. The grinding members are detachable and may be substituted by others of different sizes to meet varying conditions. Each grinding member rotates about its own axis and also makes a circuit about the carrier axis, and the speed of the said members is preferably greater than the carrier. In view of the different settings of the members 5 or 6 from the carrier center additional gears are provided for the smaller member, see Fig. 4, and both members are preferably geared to rotate in the same direction. The power for operating the machine may be applied to shafts 18, or independent motors may be used for each carrier and its grinders. The table 3 may be provided with a gear rack 37 and pinion 38 at its edge, and an intermittent rotation may be imparted thereby as the needs require.

In Figs. 5 and 6, I show a modification of the invention in that table 3 is smaller and a reciprocating carriage 40 is used instead of rotary carrier 11. One of the two grinding members on each carriage is for rough grinding and the other for polishing, and substantially the same operating mechanism is used to rotate them as hereinbefore described. Carriage 40 is slidably mounted on a suitable frame 41, or may have ball or roller supports, and the reciprocating means may comprise feed screws 42 or other devices. Table 3 is continuously rotated in this modification, while the carriage 40 is moved back and forth to subject the entire surface of the slab to the action of both the grinding and polishing members, designated by 5 and 6, respectively. Track 43 is also shown herein as a single rail laid in a circle.

Now referring to Fig. 7, this figure is a diagrammatic view embodying the essentials of the invention as described, but showing reciprocable supports for both the slabs and the abrading members. Thus, the overhead track 46 carries a reciprocable support 45 for the abrading members 5 and 6, and the base or lower track 47 guides and carries a reciprocable table or carriage 48 for the slab 49. This table 48 may be long enough to hold two or more slabs, and any mechanical means may be used to reciprocate the same.

What I claim is:

1. In a stone grinding and polishing machine, a rotatable grinding member and means to support the same for both horizontal and vertical movement, a traveling support for the slabs, and a circular track for said slab support extending beneath said grinding members.

2. In a stone grinding and polishing machine, a set of gravity grinding and polishing members and a counterbalancing means for said members, a traveling carrier adapted to move said members in a horizontal plane, and a traveling support to carry the slabs laterally beneath said members.

3. In a stone grinding and polishing machine, a rotatable carrier for the slabs arranged to travel in a circle, and separate sets of abrading devices mounted above said carrier at opposite sides of said circle and comprising carriers and a circular track from which each carrier is suspended.

4. In a stone grinding and polishing machine, a circular track and a slab support mounted to ride thereon, and separate sets of slab abrading devices bridging said track at diametrically-opposite points thereon, said devices having each a plurality of grinders adapted to rotate about a fixed axis.

5. In a stone grinding and polishing machine, a rotatable slab support, movable carriers having each a set of abrading devices on the bottom thereof, means to raise and lower said devices and means to rotate and to counterbalance the same.

6. In a stone grinding and polishing machine, means to support a slab, a rotatable abrading member for the slab, and means providing a planetary travel of said abrading member over the slab.

7. In a stone grinding and polishing machine, a slab support and a circular track therefor in a horizontal plane, in combination with separate abrading devices having horizontal and vertical movement above said slab support at different radial distances from their center of movement and means to rotate said abrading devices in planetary orbits.

In testimony whereof I affix my signature in presence of two witnesses.

GEORGE R. MURRAY.

Witnesses:
E. M. FISHER,
F. C. MUSSUN.